(12) United States Patent
Szadkowski et al.

(10) Patent No.: US 6,253,895 B1
(45) Date of Patent: Jul. 3, 2001

(54) ADJUSTABLE BUSHING FLANGE FOR CLUTCH

(75) Inventors: Andrzej Szadkowski; Eric Frandsen; Ronald Morford, all of Southern Pines, NC (US)

(73) Assignee: ZF Meritor, LLC, Maxton, NC (US)

( * ) Notice: Subject to any disclaimer, the term of this patent is extended or adjusted under 35 U.S.C. 154(b) by 0 days.

(21) Appl. No.: 09/503,220

(22) Filed: Feb. 11, 2000

(51) Int. Cl.[7] .............................. F16D 13/75; B23P 15/00
(52) U.S. Cl. ...................... 192/30 W; 29/434; 192/70.25; 192/111 A
(58) Field of Search ............................. 192/70.25, 111 A, 192/30 W; 29/434

(56) References Cited

U.S. PATENT DOCUMENTS 5,595,274 * 1/1997 Gochenour et al. .............. 192/70.25
6,050,381 * 4/2000 Uehara et al. .................... 192/70.25
6,193,039 * 2/2001 Doremus et al. ................. 192/70.25

FOREIGN PATENT DOCUMENTS 60-188628 * 9/1985 (JP) .................................. 192/70.25

* cited by examiner

Primary Examiner—Rodney H. Bonck
(74) Attorney, Agent, or Firm—Carlson, Gaskey & Olds

(57) ABSTRACT

An improved structure for allowing adjustment of a clutch due to wear includes a bushing which has a flange that is adjustably mounted on said bushing. In one method of providing the feature, the flange is provided by a washer which allows movement of the bushing within the washer in one direction but prevents movement in the opposed direction. In a second way of achieving the adjustment, the flange is provided by a nut which is threadably received on an outer periphery of the bushing.

20 Claims, 1 Drawing Sheet

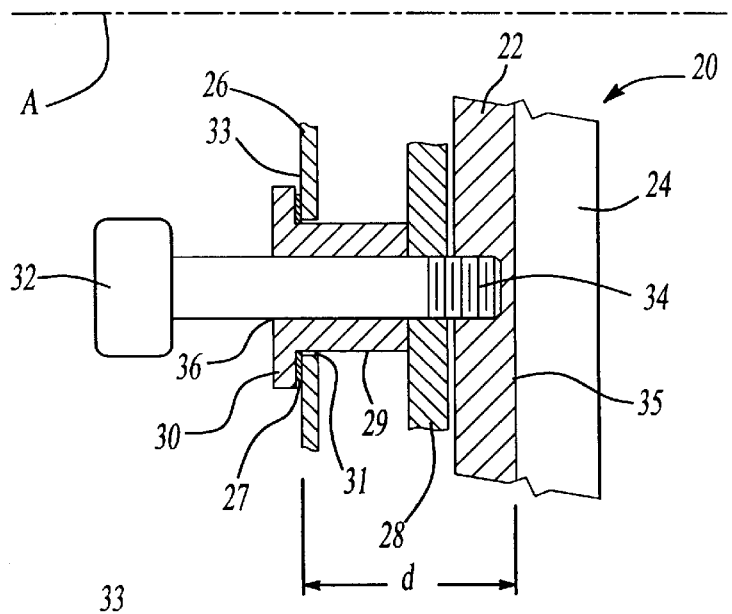
Fig-1
PRIOR ART
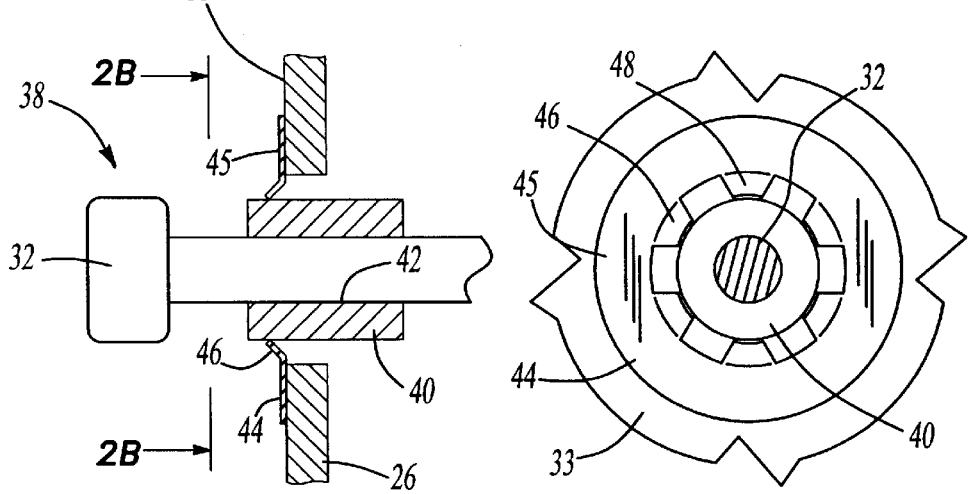
Fig-2A          Fig-2B
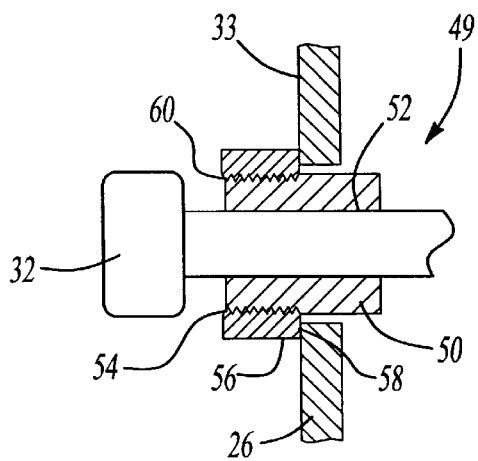
Fig-3

ADJUSTABLE BUSHING FLANGE FOR CLUTCH

BACKGROUND OF THE INVENTION

This invention relates to a improved adjustable wear sensor assembly for an adjustable clutch, and more specifically, to an adjustable wear sensor assembly bushing wherein the location of a locating flange on the bushing is adjustable.

Clutches are utilized in many vehicle drive applications. As is known, a clutch selectively transmits or breaks a drive connection between an engine and a transmission. In one common type of clutch which is widely utilized in heavy vehicles, a clutch includes a pressure plate which rotates with a clutch cover. A fulcrum selectively forces the pressure plate against a member which is to be driven to rotate with the pressure plate and clutch cover. When the pressure plate is forced against the driven member, it sometimes must move to accommodate wear on friction surfaces in the clutch. This wear adjustment is widely utilized in modern heavy vehicle clutch applications.

Wear adjustment is typically achieved by using a wear sensor assembly that senses the wear within the clutch. The wear sensor assembly cooperates with an adjustment assembly that adjusts the location of the clutch components relative to one another to maintain pedal travel parameters and proper operation of the clutch. There are numerous wear sensor assemblies that have been used in the prior art.

In one very standard way of sensing wear, at least one pin, typically four, is fixed to the pressure plate. A bushing is received in the clutch cover and has a flange that abuts the clutch cover and locates the bushing and the clutch cover relative to the pressure plate. The pin is interference fit within a bushing such that movement of the bushing relative to the pin is normally restricted. Thus, the pin typically moves with the bushing, and the pressure plate is maintained at a distance from the clutch cover. However, with wear, sometimes upon application of the clutch, the pressure plate must move an additional amount relative to the clutch cover to fully engage the driven member. When this happens the pressure plate is forced further and the pin may move through its interference fit in the bushing to allow the pressure plate to fully engage the clutch.

The distance between the pressure plate and clutch cover must be set at assembly of the clutch to ensure proper wear adjustment and clutch operation. Since the flange is integral with the bushing in prior art arrangements, the distance between the pressure plate and clutch cover must be set by installing shims between the flange and clutch cover to obtain a "zero gap" in the clutch's engaged position and compensate for tolerances, which is time consuming and costly.

SUMMARY OF THE INVENTION

In a disclosed embodiment of this invention, the location of the flange on the bushing is adjustable to accommodate adjustment of the beginning position of the flange relative to the pressure plate at assembly. That is, the position of the flange on the bushing is adjustable such that the overall distance between the bushing flange, and therefore the clutch cover, is adjustable relative to the pressure plate to compensate for tolerances.

In one embodiment, the bushing flange is provided by a Belleville or other resilient washer which is force fit onto an outer periphery of a bushing. The bushing has an outer diameter which is smaller than the inner diameter of an opening in the clutch cover. The washer is larger than the inner diameter of the clutch cover, and is fixed to the bushing. The washer preferably has a structure such that the bushing can move in one direction within the washer, but cannot move in an opposed direction during operation of the clutch. In this way, the position of the bushing relative to the washer can be adjusted by forcing the bushing within the washer in the first direction to achieve a desired location.

In a preferred embodiment, the one way adjustment feature is achieved by having teeth on an angled surface of the washer which dig into the outer surface of the bushing.

In a second embodiment, the flange is threadably received on an outer peripheral surface of the bushing. In this way, the position of the flange may be adjusted to properly position the flange relative to the pressure plate and initial setup of the clutch. At that time, the threads between the nut and the bushing can be coined to prevent further turning movement. These and other features of the present invention can be best understood from the following specification and drawings, the following of which is a brief description.

BRIEF DESCRIPTION OF THE DRAWINGS

FIG. 1 is a view of a prior art clutch;

FIG. 2A shows a first embodiment of the bushing flange;

FIG. 2B is a front view of the embodiment shown in FIG. 2A; and

FIG. 3 shows a second embodiment of the bushing flange

DETAILED DESCRIPTION OF A PREFERRED EMBODIMENT

A prior art clutch 20 is illustrated in FIG. 1. A pressure plate 22 is movable toward a member to be driven 24. A clutch cover 26 is positioned at a set distance d away from the pressure plate forward surface. A lever, which is coupled to a clutch pedal, selectively forces the fulcrum ring 28 and pressure plate 22 along an axis A toward the driven member 24.

After wear of the friction surfaces which are found between the pressure plate 22 and the driven member 24, the pressure plate 22 may need to move further to the right to achieve a fully engaged clutch. It should be understood that the structure shown in FIG. 1 is highly schematic, and that the clutch 20 would typically include a number of additional components. However, for purposes of understanding the invention, the main elements of the clutch are shown schematically.

A bushing 29 is received within a hole 31 in the clutch cover 26. The bushing 29 has an integral outer flange 30 which abuts an outer surface 33 of the clutch cover 26. A shim 27 is arranged between the flange 30 and the clutch cover 26. The pin 32 is received within a bore 36 in the bushing 29 in an interference fit relationship. An end 34 of the pin 32 is threaded into a threaded hole in the pressure plate 22 to secure the pin 32 thereto so that the clutch cover 26 and pressure plate 22 rotate together about axis A. The distance between the outer surface 33 of the clutch cover 26 and the inner surface 35 of the pressure plate 22 is approximately the distance allowed for movement of the pressure plate 22 between engaged (shown in FIG. 1) and disengaged positions.

In the disengaged position, the pressure plate 22, pin 32, and bushing 29 are moved to the left from the position shown in FIG. 1. In the disengaged position (not shown), the flange 30 is spaced from the outer surface 33 of the clutch cover 26. The full stroke of the pressure plate 22 is nominally defined by when the flange 30 abuts the outer surface of the clutch cover 26. Once this abutment occurs, further movement of the pressure plate 22 relative to the clutch cover 26 is prevented. However, if further movement is necessary for engagement of the clutch, the force of the lever is sufficiently great to force the pin 32 to slide within the bore 36 and allow the pressure plate 22 to move further to the right. An adjustment mechanism (not shown) adjusts the fulcrum ring 28 relative to the pressure plate 22 to accommodate wear in the clutch.

Other types of arrangements utilize a bushing interference fit within the hole in the clutch cover. The pin is received with a bore in the bushing in a slip fit relation. During wear adjustments, the bushing is forced to move within the hole relative to the outer surface of the clutch cover. There are some deficiencies with these prior art wearing sensor assemblies in that there has been no way to easily tailor the distance d as a result of tolerance stack ups of clutch components.

FIG. 2A shows bushing assembly 38 wherein this problem is addressed so that the expensive shimming process may be eliminated. Furthermore, the present invention permits looser tolerances so that the cost of assembly may be further reduced. The bushing 40 has a bore 42 which receives a pin 32, similar to the prior art. The flange 44, which is adjustable, abuts the outer surface of the clutch cover 26. An inner angled portion 46 is angled outwardly relative to the rest of the clutch components.

As is shown in FIG. 2B, the surface 46 has a plurality of teeth 48. The teeth 48 dig into a surface of the bushing 40. The teeth 48 allow the bushing 40 to be forced to the left as shown in FIG. 2A, but not allow the bushing 40 to be moved to the right relative to the flange 44. Thus, when the clutch is initially being assembled or adjusted, a worker will be able to move the bushing 40 relative to the flange 44 to achieve a desired distance d. However, the bushing 40 is then locked at the desired position by the teeth 48. In this way, the relative position of the flange 44 can be adjusted to achieve a desired location and distance d for the individual clutch.

FIG. 3 shows a second embodiment of a bushing assembly 49. Bushing 50 has a bore 52 receiving the pin 32. Further, threads 54 are formed at an outer periphery and receive a nut flange 56. As with the prior invention, a worker may now adjust the position of the flange 56 relative to the bushing 50 to achieve a desired amount of movement and a desired distance d. The threads then may be coined as shown at 60 to prevent further movement of the nut 56 on the sleeve 50. In this way, a worker can also tailor the individual structure of the clutch and its adjustment structure.

Although preferred embodiments of this invention have been disclosed, a worker in this art would recognize that many modifications would come within the scope of this invention. For that reason, the following claims should be studied to determine the true scope and content of this invention.

What is claimed is:

1. A clutch comprising:
   a pressure plate movable along a rotational axis for actuating a clutch member;
   a clutch cover spaced from said pressure plate by a desired distance, said clutch cover having a hole therethrough extending from an outer surface of said clutch cover and spaced from said rotational axis;
   a pin having an end secured to said pressure plate and said pin being disposed within said hole for constraining said clutch cover and said pressure plate together for rotation about said rotational axis;
   a bushing disposed within said hole, said bushing having a bore receiving said pin in an interference fit relationship; and
   an adjustable flange abutting said outer surface of said clutch cover in an engaged position and receiving said bushing, said adjustable flange initially movable relative to said bushing for achieving said desired distance at assembly of said clutch, said flange and said bushing coacting with one another for preventing said bushing from moving toward said pressure plate relative to said flange subsequent to assembly of said clutch.

2. The clutch of claim 1, wherein said pin is movable in said bore such that said pin end moves away from said clutch cover relative to said bushing when a predetermined force is applied to said pin for accommodating wear in said clutch.

3. The clutch of claim 2, wherein said flange comprises a washer received on an outer periphery of said bushing.

4. The clutch of claim 3, wherein said washer has a surface angled away from said outer surface toward said pin which permits movement of said bushing relative to said washer in one direction while preventing movement of said bushing relative to said washer in an opposite direction.

5. The clutch of claim 4, wherein said angled surface includes a plurality of circumferentially spaced teeth extending inwardly toward said outer periphery.

6. The clutch of claim 2, wherein said flange comprises a nut threaded onto an outer periphery of said bushing.

7. The clutch of claim 6, wherein a threaded engagement surface between said nut and said bushing is coined once said desired position is achieved.

8. The cluth of claim 1, wherein a fulcrum ring is interposed between said clutch cover, and said pressure plate, and said pin passes through an opening in said fulcrum ring with said fulcrum ring being adjustable relative to said pressure plate along said rotational axis.

9. A method of assembling a clutch comprising the steps of:
   a) providing a pressure plate and a clutch cover spaced from the pressure plate with the clutch cover having a hole therethrough and a pin disposed therein and secured to the pressure plate, a bushing disposed within the hole with the bushing having a bore receiving the pin, and an adjustable flange receiving the bushing; and
   b) adjusting the bushing relative to the adjustable flange to achieve a desired distance between the pressure plate and the clutch cover, the flange and the bushing coacting with one another for preventing the bushing from moving toward the pressure plate relative to the flange subsequent to assembly of the clutch.

10. The method of claim 9, wherein the adjustable flange comprises a washer received on an outer periphery of the bushing, and step b) comprises moving the bushing relative to the washer along the outer periphery.

11. The method of claim 9, wherein the adjustable flange comprises a nut threaded onto an outer periphery of the bushing, and step b) comprises turning the nut relative to the bushing.

12. A clutch comprising:
   a pressure plate movable along a rotational axis for actuating a clutch member;
   a clutch cover spaced from said pressure plate by a desired distance;
   a first wear sensing member secured to said pressure plate and extending through a hole in said clutch cover for constraining said clutch cover and said pressure plate together for rotation about said rotational axis;

a second wear sensing member disposed within said hole, said first and said second wear sensing members movable relative to one another; and an adjustable member interposed between said second wear sensing member and said clutch cover, said adjustable member initially movable relative to said clutch cover for achieving said desired distance at assembly of said clutch, said adjustable member and said second wear sensing member coacting with one another for preventing said second wear sensing member from moving toward said pressure plate relative to said adjustable member subsequent to assembly of said clutch.

13. The clutch of claim 12, wherein said first wear sensing member comprises a pin having an end secured to said pressure plate and said pin being disposed within said hole, wherein said second wear sensing member comprises a bushing having a bore receiving said shaft in an interference fit relationship, and wherein said adjustable member comprises a flange abutting an outer surface of said clutch cover in an engaged position and receiving said bushing, said flange initially movable relative to said bushing for achieving said desired distance at assembly of said clutch.

14. The clutch of claim 13, wherein said pin is movable in said bore such that said pin end moves away from said clutch cover relative to said bushing when a predetermined force is applied to said pin for accommodating wear in said clutch.

15. The clutch of claim 14, wherein said flange comprises a washer received on an outer periphery of said bushing.

16. The clutch of claim 15, wherein said washer has a surface angled away from said outer surface toward said pin which permits movement of said bushing relative to said washer in one direction while preventing movement of said bushing relative to said washer in an opposite direction.

17. The clutch of claim 16, wherein said angled surface includes a plurality of circumferentially spaced teeth extending inwardly toward said outer periphery.

18. The clutch of claim 14, wherein said flange comprises a nut threaded onto an outer periphery of said bushing.

19. The clutch of claim 18, wherein a threaded engagement surface between said nut and said bushing is coined once said desired position is achieved.

20. The clutch of claim 12, wherein a fulcrum ring is interposed between said clutch cover, and said pressure plate, and said pin passes through an opening in said fulcrum ring with fulcrum ring being adjustable relative to said pressure plate along said rotational axis.

* * * * *